United States Patent [19]

Mizusawa et al.

[11] Patent Number: 4,679,958
[45] Date of Patent: * Jul. 14, 1987

[54] BALL JOINT

[75] Inventors: Akira Mizusawa, Fujisawa; Daiji Nakama, Chigasaki, both of Japan

[73] Assignee: Nifco, Inc., Yokohama, Japan

[*] Notice: The portion of the term of this patent subsequent to Feb. 4, 2003 has been disclaimed.

[21] Appl. No.: 807,016

[22] Filed: Dec. 9, 1985

Related U.S. Application Data

[60] Division of Ser. No. 744,304, Jun. 13, 1985, Pat. No. 4,568,216, which is a continuation of Ser. No. 430,361, Sep. 30, 1982, abandoned.

[30] Foreign Application Priority Data

Oct. 23, 1981 [JP]  Japan ................................. 56-156928
Jun. 15, 1982 [JP]  Japan ................................. 57-88058

[51] Int. Cl.$^4$ ............................................. F16C 11/00
[52] U.S. Cl. .................................. 403/143; 403/122; 403/141; 403/327
[58] Field of Search ............... 403/122, 143, 141, 327, 403/56, 76, 90, 133

[56] References Cited

U.S. PATENT DOCUMENTS 3,817,639  6/1974  Good ................................. 403/122
3,856,422 12/1974  Trefry ............................... 403/122
4,410,295 10/1983  Ersoy et al. ....................... 403/122

FOREIGN PATENT DOCUMENTS 532921  11/1956  Canada ............................. 403/122
337220   5/1929  Fed. Rep. of Germany ...... 403/143
826809   7/1949  Fed. Rep. of Germany ...... 403/122
758975  12/1952  Fed. Rep. of Germany ...... 403/143
666989  10/1929  France ............................. 403/143
205689  10/1923  United Kingdom .............. 403/143

Primary Examiner—Richard J. Scanlan, Jr.
Attorney, Agent, or Firm—Oblon, Fisher, Spivak, McClelland & Maier

[57] ABSTRACT

A ball joint comprises a ball stud containing a ball at the leading end thereof, a socket incorporating therein a receptacle for admitting of the ball, and a resilient metallic ring containing a gap therein and adapted to retain the ball rotatably within the receptacle. The receptacle is formed of a main body and an auxiliary body adapted to be attached fast to the main body, and at least the main body is formed of a plastic material. Retention of the ball within the socket is accomplished by setting the resilient metallic ring in position within the receptacle before attachment of the auxiliary body to the main body, driving the ball into the receptacle thereby causing the equator of the ball to widen the gap in the resilient metallic ring and slide past the ring, and consequently enabling the ring to get hold of the ball.

2 Claims, 11 Drawing Figures

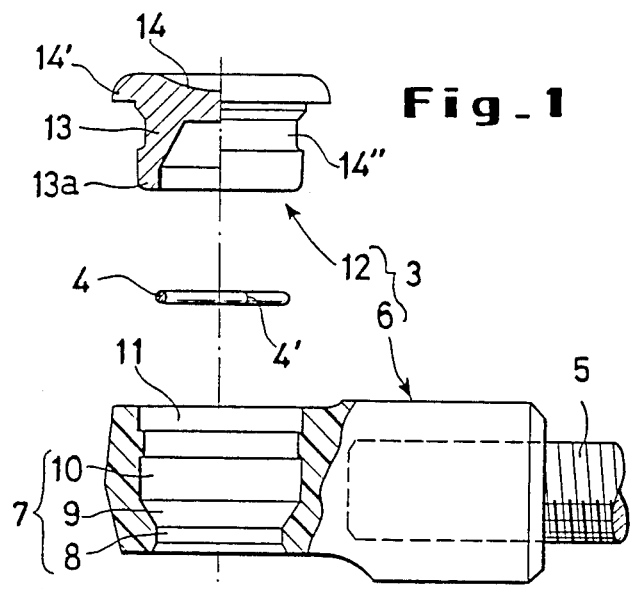
Fig_1
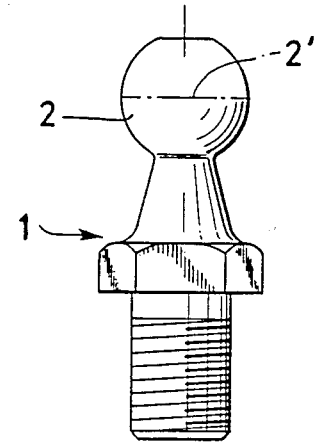
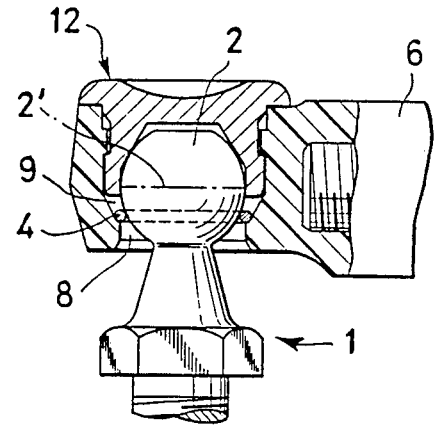
Fig_2
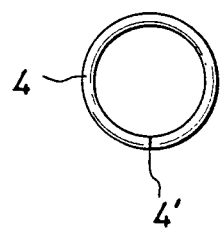
Fig_3

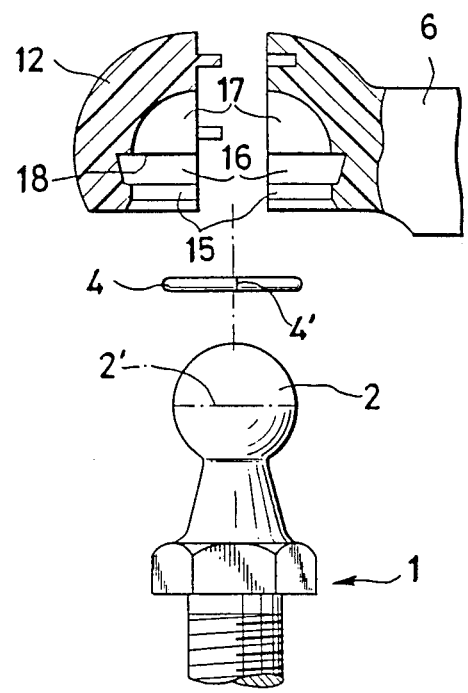
Fig_4
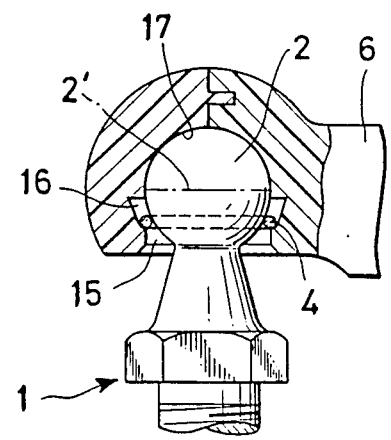
Fig_5
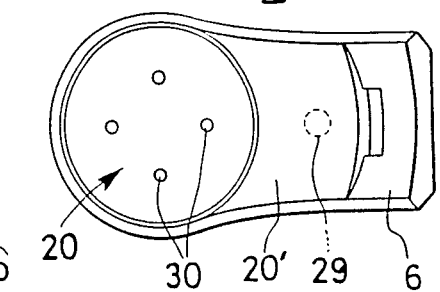
Fig_7
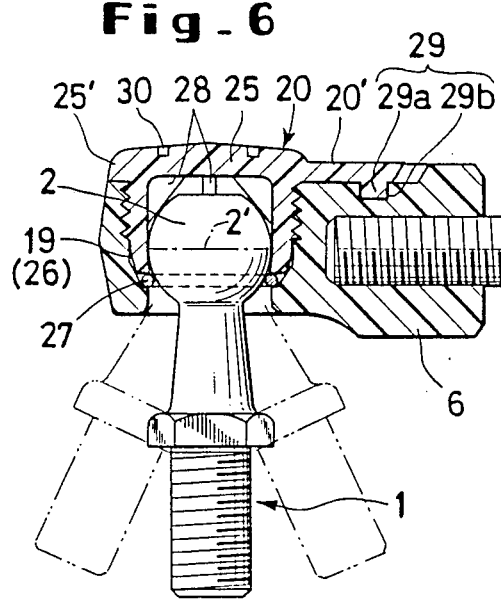
Fig_6
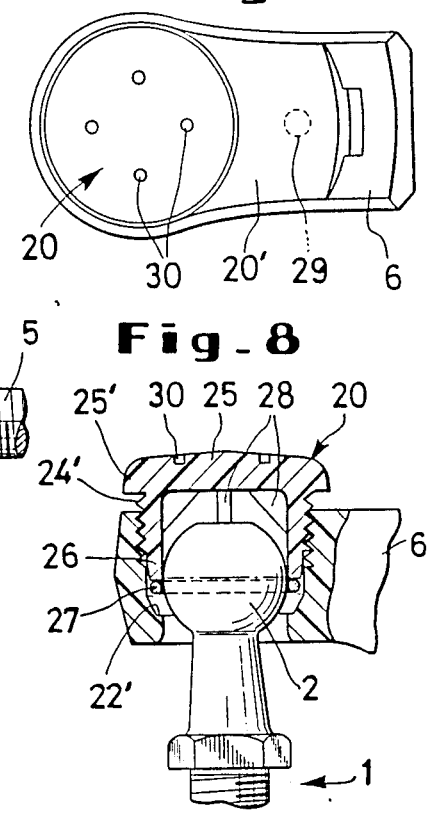
Fig_8

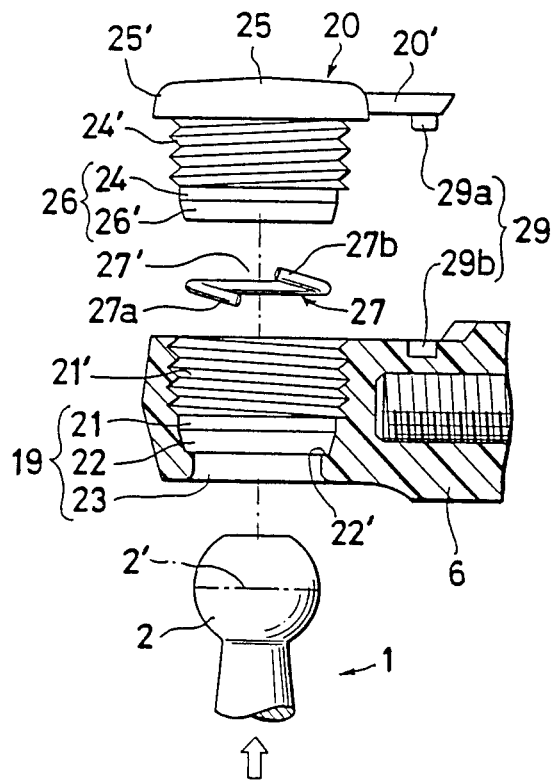
Fig_9
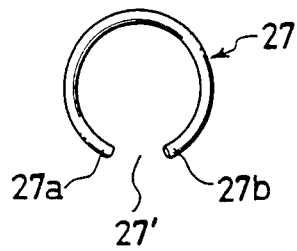
Fig_10
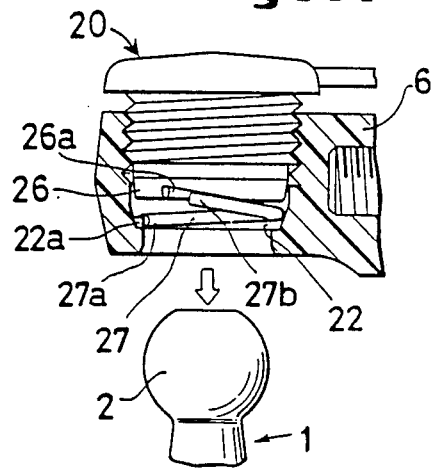
Fig_11

BALL JOINT

This is a division of application Ser. No. 744,304, filed June 13, 1985, now U.S. Pat. No. 4,568,216, which in turn is a continuation of Ser. No. 430,361 filed on Sept. 30, 1982, abandoned.

BACKGROUND OF THE INVENTION

This invention relates to a ball joint in which a socket serving to hold rotatably therein a ball of a ball stud is formed of a plastic material.

In the conventional ball joint, the socket is made of a metallic material similarly to the ball stud and is provided at one portion thereof with a cavity having a depth slightly greater than the radius of the ball of the ball stud and an opening of a diameter slightly greater than the equatorial diameter of the ball. For the socket of this construction to retain safely the ball of the ball stud in position, it requires use of a resilient metallic ring containing a gap and having a diameter slightly greater than the diameter of the opening of the cavity. The retention of the ball in the socket is accomplished by forcing the resilient metallic ring into the cavity through the opening while causing the metallic ring to be drawn together across the gap and contracted radially and subsequently forcing the ball of the ball stud into the cavity through the opening thereby enabling the metallic ring to be radially expanded by virtue of the gap thereof and slid over the incoming ball until beyond the equatorial periphery thereof and allowing the resilient metal ring to get firm hold of the ball inside the cavity and keep the ball stud from moving away from the socket. This work of driving the resilient metallic ring into the cavity past the opening by forcing the metallic ring to be contracted radially calls for much time and labor. Moreover, this socket has no alternative but to rely solely upon the resiliency of the metallic ring containing the gap for the retaining force required to discourage separation of the ball stud from the socket. The metallic ring is produced by looping a metallic wire. This fact implies that the diameter of the ring and the size of the gap in the ring may vary from unit to unit and this variation may cause nonuniformity in retaining force.

For the purpose of preventing the resilient metallic ring from slipping off the cavity, the cavity is provided with an annular step which protrudes into the cavity from the generally spherical wall defining the cavity. Since this annular step cannot be formed integrally with the socket by reason of restrictions from the manufacturing technique, it is produced by spot-facing with a lathe after the socket has been forged out. Thus, the provision of this annular step impairs the efficiency of machining operation and increases the cost of production.

With a view to solving all these problems, there have been developed ball joints using sockets made of a plastic material (as disclosed in U.S. Pat. Nos. 4,084,913, 4,225,261 for example). Although the adoption of plastic sockets in these ball joints has undeniably served to protect the ball joints against rusting and reduce the overall weight of the ball joints, it has conversely given birth to drawbacks. The ball joints of this type are predominantly used as gas-spring joints in the rear doors of automobiles. Normally quite heavy loads are imposed on these components. In the case of ball joints using plastic sockets, the devices provided on the car body side or the door side for retaining the balls of the joints in position are the claws which are integrally formed with the plastic sockets in the ball joints. Owing to the brittleness of the plastic material used, accidental separation of the balls from their plastic sockets has happened frequently.

SUMMARY OF THE INVENTION

An object of this invention is to provide a ball joint provided with a socket capable of precluding the rusting, a fault inherent in metallic sockets, permitting a reduction in the overall weight of the ball joint, and producing notably improved force for retaining the ball of the ball stud in position.

To meet the object described above, the socket in the ball joint of this invention has the receptacle for retaining the ball at the end of the ball stud in position, formed of the cavity of a main body of the socket and an auxiliary body adapted to be applied fast to the aforementioned main body, so that the resilient metallic ring may be set in position in the receptacle and allowed to slide over the ball past the equatorial periphery thereof and catch hold of the ball, whereby the socket is enabled to acquire notably improved force for retaining the ball in position. Further by having at least the aforementioned main body formed of a plastic material, the socket permits a reduction in the overall weight of the ball joint and at the same time protects the ball joint against rusting.

The other objects and the other characteristics of the present invention will become apparent from the further disclosure of the invention to be made herein below with reference to the accompanying drawing.

BRIEF EXPLANATION OF THE DRAWING

FIG. 1 is a partially sectioned side elevation illustrating, in an exploded state, one embodiment of the ball joint of the present invention.

FIG. 2 is a partially sectioned side elevation illustrating, in an assembled state, the ball joint of FIG. 1.

FIG. 3 is a plan view of a ring to be used in the ball joint of FIG. 1.

FIG. 4 is a partially sectioned side elevation illustrating, in an exploded state, a second embodiment of the ball joint of the present invention.

FIG. 5 is a partially sectioned side elevation illustrating, in an assembled state, the ball joint of FIG. 4.

FIG. 6 is a sectioned side elevation illustrating a third embodiment of the ball joint of this invention.

FIG. 7 is a plan view of the ball joint of FIG. 6.

FIG. 8 is a cross section illustrating the ball joint of FIG. 6, with the auxiliary body thereof held loose.

FIG. 9 is a sectioned side elevation illustrating, in an exploded state, the ball socket of FIG. 6.

FIG. 10 is a plan view of a ring to be used in the ball joint of FIG. 6.

FIG. 11 is a sectioned side elevation illustrating a fourth embodiment of the ball joint of the present invention.

DESCRIPTION OF THE PREFERRED EMBODIMENT

FIGS. 1-3 illustrate the first embodiment of the ball joint of this invention. A ball stud 1 has a ball 2 formed at the terminal thereof and a socket 3 made of a plastic material irremovably retains the aforementioned ball 2 at one end portion thereof with a resilient metallic ring 4. The socket 3 is composed of a main body 6 having a clamping screw 5 attached fast to the other end portion of the socket either by being helically driven therein or being inserted in position during plastic molding and an auxiliary body 12 molded such as of a plastic material separately of the main body 6 and attached fast to the main body to form a receptacle for retaining the ball 2 therein. In the first embodiment, the main body 6 is provided at one end portion thereof with a generally tubular hole (cavity) 7 perforated in a vertical direction. This hole 7 consists of a lower portion 8 having an inside diameter slightly larger than the diameter of the ball 2, a tapered portion 9 having an inside diameter gradually increased upwardly, and a cylindrical portion 10 extended upwardly in one fixed inside diameter from the upper end of the tapered portion 9. In the illustrated embodiment, a slightly raised protuberance 11 is formed on the inner wall surface of the cylindrical portion 10 halfway along the height thereof.

The auxiliary body 12 consists of a tubular wall 13 adapted to be inserted downwardly into the aforementioned cylindrical portion 10 and a lid wall 14 adapted to stop the upper end of the tubular wall 13. The lid wall 14 integrally incorporates a flange 14' which is expanded out of the periphery of the tubular wall 13 and adapted to land fast on the upper surface of the main body 6. The interior of the tubular wall has the shape of a dome for admitting of the ball 2 to a depth slightly past the equatorial periphery 2' constituting the boundary of the upper hemisphere of the ball 2. The downward length of the tubular wall is fixed so that the lower end of the tubular wall may fall directly on or slightly above the upper end of the tapered portion 9 when the flange 14' is brought into contact with the upper surface of the main body and the tubular wall is inserted home within the cylindrical portion 10 of the hole 7. In the present embodiment, for the purpose of enabling the aforementioned protuberance 11 to prevent the auxiliary body 12 already fitted into the cylindrical portion 10 from being accidentally removed, the lower half portion 13a of the tubular wall 13 is given an outside diameter substantially equal to the inside diameter of the cylindrical portion 10 and an annular groove 14" for receiving the protuberance 11 is formed above the lower half portion 13a. When the auxiliary body is driven downwardly with slight force into the cylindrical portion 10 of the hole 7, therefore, the lower half portion 13a of the tubular wall will slide past the protuberance downwardly and get caught inextractably on the lower edge of the protuberance 11 after the flange 14' has collided against the upper surface of the main body.

Preparatory to the assemblage of the ball joint, the metallic ring 4 having an inside diameter slightly smaller than the diameter of the ball 2 and an outside diameter slightly larger than the inside at the lower end of the tapered portion 9 is dropped into the hole 7 and received snugly along the inner wall of the tapered portion at the lower end thereof. Then, the auxiliary body is inserted downwardly into the hole and fitted fast in the cylindrical portion 10 and the ball 2 of the stud is forced upwardly into the hole 7 through the lower portion 8. During the insertion of the ball 2, the ring 4 is pushed up the tapered portion by the ball because the inner diameter of the ring 4 is slightly smaller than the equatorial diameter of the ball. When the ring reaches the lower end of the auxiliary body, it is no longer allowed to continue its upward motion. Consequently, the ball forces its way past the ring by causing the ring to expand by virtue of the cut 4' until the equatorial periphery 2' of the ring rises slightly above the ring, with the top of the ball substantially coming into contact with the lower surface of the lid wall 14. The ring, how tending to shrink back to its original diameter, slides downwardly on the surface of the lower hemisphere of the ball and, after resuming the original diameter, comes to rest along the inner wall surface of the tapered portion at the lower end.

The ring in the new position keeps the ball from falling down and, accordingly, allows the stud 1 to produce rotary motion relative to the socket 3.

The resilient ring 4 can be simply dropped into the hole through the upper end of the cylindrical portion 10 without having to be radially contracted. The opposed ends of a looped resilient wire forming the cut 4' of the ring, therefore, may be brought as closely to each other as possible as illustrated in FIG. 3. Compared with the conventional ball joint which uses a ring having a wide gap with the opposed ends of the looped resilient wire separated so amply as to permit insertion of the ring into the cavity of the socket by forced reduction in the diameter thereof, the ball joint of this invention enjoys an advantage that the ring offers a greatly increased force for retaining the ball in position. Further, since the ball is retained in position with its top substantially in contact with the lower surface of the lid wall of the auxiliary body, the stud is now allowed to produce any play in the axial direction thereof and is kept from generating noise.

For the purpose of this invention, it suffices to have only the main body of the socket formed of a plastic material. Since the auxiliary body is small, it may be formed of a metallic material without appreciably increasing the overall weight of the ball joint. In the present embodiment, the auxiliary body fitted in the main body is kept from accidental separation by virtue of the protuberance 11 and the annular groove 14". Otherwise, the prevention of the accidental separation may be precluded by forming a female and a male screw thread respectively on the inner surface of the cylindrical portion 10 and the outer surface of the tubular wall and helically fitting the cylindrical portion 10 and the tubular wall fast to each other, or by welding them together, or by fusing them by high frequency welding.

In the second embodiment illustrated in FIG. 4 and FIG. 5, the receptacle of the socket for admitting of the ball is divided into two equal halves across a plane perpendicular to the equatorial periphery 2' of the ball, with one of the halves provided in the main body 6 and the other half in the auxiliary body 12. The receptacle, therefore, is completed by fusing the main body 6 and the auxiliary body 12 along the plane of separation such as by high frequency welding.

The receptacle in its complete form consists of a downwardly opening lower end portion 15 having an inside diameter slightly smaller than the diameter of the ball in the equator, a tapered portion 16 having an inside diameter gradually increased upwardly from the lower portion 15, and a domed recess (cavity) 17 for admitting of the ball from the top to a little below the equatorial periphery thereof. The main body and the auxiliary body incorporate one each of the two halves of the receptacle. Optionally, a protuberance may be formed at a suitable position on one of the opposed surfaces of the main body and the auxiliary body and a recess for receiving the aforementioned protuberance may be formed at the corresponding position in the other opposed surface.

Also in this embodiment, there is used a resilient metallic ring 4 which has the severed ends thereof brought close to each other across the cut 4'. Preparatory to the intimate union of the opposed surfaces of the main body and the auxiliary body, this resilient metallic ring is placed between the opposed halves of the tapered portion 16. Subsequently, the main body and the auxiliary body are joined in a correctly aligned state by adhesion or high frequency welding. Of course, this ring has an inside diameter slightly smaller than the equatorial diameter of the ball and an outside diameter slightly larger than the inside diameter of the lower portion 15 or the inside diameter at the lower end of the tapered portion 16.

In the construction described above, the ring 4 is stopped by the lower end of the tapered portion. Into the stopped ring 4, the ball of the stud is pushed upwardly into the receptacle until the equatorial periphery of the ball is slid upwardly past the ring 4. In this embodiment, the shoulder face 18 formed in the boundary between the upper end of the tapered portion 16 and the domed recess 17 serves to limit the upward motion of the ring 4 to a certain degree and enables the ball to widen the cut 4' of the ring and radially expand the ring.

In this embodiment, since the main body and the auxiliary body of the socket are both formed of a plastic material, it has a light weight. The ring may be totally devoid of the gap. In the absence of this gap, the ring produces a greater force for retaining the ball in position. Thus, the present embodiment is as effective as the embodiment described previously.

The third embodiment illustrated in FIGS. 6-10 makes use of a resilient metallic ring containing a wide cut (gap). When the metallic ring is placed in the assembled ball joint, the gap in this metallic ring is smaller than when the metallic ring is left standing in its original state. Thus, the force necessary for keeping the ball stud from falling off the ball joint may be derived not only from the resiliency of the metallic ring but also from the fact that the diameter of the ring is decreased and the gap in the ring is decreased.

Referring now to the drawing, the ball stud 1 has a ball 2 at the upper end thereof and it is made of a metallic material. The main body 6 of the socket is provided at one end portion thereof with a hole (cavity) 19 perforated in a vertical direction for receiving the ball. A cap 20 is adapted to be helically driven downwardly the hole 19 in the main body to form a ball receptacle. The main body 6 and the auxiliary body 20 are separately made of a plastic material.

The hole 19 is provided in the upper half of the interior thereof with a cylindrical portion 21 containing a female screw thread 21' on the inner wall surface thereof. The lower end of this cylindrical portion continues into a tapered face 22 having a downwardly decreasing inside diameter. At the lower end of the tapered surface 22, there is provided a step 22' slightly protruding from the inner wall surface. The lower end of the step continues into a cylindrical hole 23 having a diameter equal to or slightly larger than the diameter at the equator 2' of the ball 2. The cap 20 is provided with a tubular wall 24 containing on the periphery thereof a male screw thread 24' matched to the aforementioned female screw thread 21' and having an inside diameter equal to or slightly larger than the equatorial diameter of the ball and an upper wall 25 closing the upper end of the tubular wall and having formed round the periphery thereof a flange 25' extending outwardly from the periphery of the tubular wall 24. The tubular wall 24 is provided with an extended portion 26 drawn downwardly beyond the limit of the male screw thread 24'. The outer surface of the extended portion 26 forms a tapered surface 26' matched to the tapered surface 22 of the hole receptacle.

The present embodiment makes use of a metallic ring 27 which contains a gap 27' and is made of a resilient metallic wire. By driving this cap into the hole and pressing the metallic ring 27 by the lower end of the extended portion 26 of the cap against the step 22' at the lower end of the tapered surface 22, the gap in the ring is narrowed and the diameter of the ring is decreased.

On the assumption that the diameter at the equator 2' of the ball 2 is 10 mm, the metallic ring formed by looping a metallic wire 1 mm in diameter with the size of the gap at 3.5 mm, the inside diameter in the range of 9.8 to 10.2 mm, and the outside diameter in the range of 11.8 to 12.2 mm may be easily fitted on the ball beyond the equator thereof. The inside diameter of the cylindrical portion 21 of the hole is 13.1 mm, that of the tapered surface 22 at the converged end is 10.6 mm, and that of the cylindrical hole 23 is 10.0 mm. Consequently, the depth of the step 22' is 0.3 mm, the outside diameter of the tubular wall 24 of the cap is 13 mm, the inside diameter of the cap where the interior of the cap comes into contact with the equator of the ball is in the range of 10 to 10.1 mm, the inside diameter being slightly increased downwardly at an angle of about 5°, and the outside diameter at the lower end of the extended portion, namely the step of the tapered surface 26', is in the range of 11.4 to 11.6 mm.

The ball joint in the present embodiment is assembled by passing the ball 2 upwardly through the hole 19 of the main body, then fitting the metal ring 27 downwardly onto the ball 2 until the lower end thereof falls below the equator 2' of the ball, subsequently lowering the ball stud, and helically driving the cap downwardly into the hole. This assemblage may otherwise be accomplished by inserting the metallic ring 27 downwardly into the hole 19, then helically driving the cap to a slight extent, subsequently inserting the ball upwardly into the hole until the equator of the ball rises past the metallic ring, and helically driving the cap to the fullest extent.

In any event, since the inside diameter of the metallic ring is slightly larger or slightly smaller than the diameter at the equator of the ball, the ball can be inserted with absolutely no resistance when the inside diameter of the metallic ring is larger or the ball can be passed through the metallic ring with application of slight force enough to widen the gap to a certain extent within the hole. When the cap is helically driven completely into the hole, the metallic ring is drawn down the tapered surface 22 by the pressure exerted by the lower end of the cap. In this while, the gap 27' in the ring is narrowed and the inside diameter of the ring is decreased below the equatorial diameter of the ball. Thus, the ring is held down under the step 22' of the tapered surface. Unlike the conventional metallic ring which solely relies upon the resiliency thereof, the metallic ring in this embodiment acquires the force necessary for keeping the ball stud from slipping out of the socket from the force with which the cap presses down the metallic ring under the lower end of the tapered surface and decreases the diameter of the metallic ring. Thus, a desired force for the retention of the ball in the receptacle can be freely derived from the resiliency of the ring and the pressing force of the cap.

When the gap 27' is formed in the metallic ring 27 during the fabrication of the metallic ring, the opposed edges 27a, 27b, fall askew as illustrated. When the cap is helically driven completely into the hole, therefore, the opposed ends thus held askew to each other are compressed between the lower end of the cap and the step at the lower side of the tapered surface 22. Since the cap is resiliently pressed upwardly, the possible play between the cap and the main body of the socket is completely eliminated.

When some mechanical trouble develops between the object to which the main body of the socket is attached fast with the screw 5, and the object to which the ball stud 1 is attached fast as between the body of an automobile and the hatchback door for opening and closing an opening in the automobile body, there may possibly arise necessity for removing the ball joint. In the present embodiment, the cap (auxiliary body) can be loosened to a desired extent from the hole in the main body. By slightly loosening the cap instead of removing the ball stud or the main body of the socket, therefore, the metallic ring 27 is allowed to rise along the tapered surface 22 and increases its diameter by virtue of its own resiliency. A downward pull given to the ball stud, therefore, enables the ball to slide through the metallic ring and then out of the hole. Thus, the ball joint can be disassembled. After the mechanical trouble has been mended, the ball joint can be reassembled by inserting the ball upwardly into the hole and subsequently driving the cap helically into the hole.

FIG. 8 depicts the ball joint of the present embodiment with the cap 20 slightly loosened. Here, the ring 27 has an inside diameter slightly smaller than the equatorial diameter of the ball. The ring, therefore, is wrapped round the ball immediately below the equator thereof. There happens to occur an annular space between the periphery of the ring and the inner surface of the hole, specifically the upper end of the tapered surface 22 or the lower end of the cylindrical portion 21. Even when the inside diameter of the ring is slightly smaller than the equatorial diameter of the ball, therefore, a downward pull given to the ball stud enables the equator of the ball to expand the ring and slide past the ring. Consequently, the ball stud comes off the receptacle. The ball joint can be reassembled by conversely inserting the ball of the ball stud upwardly into the hole thereby enabling the equator of the ball to expand the ring and force its way through the ring and thereafter driving the cap helically into the hole. When the inside diameter of the ring is slightly larger than the equatorial diameter of the ball, the loosening of the cap enables the equator of the ball to move past the ring without experiencing any resistance. Consequently, the ball stud comes loose all by itself when the ball joint is dissassembled.

In accordance with this invention, the metallic ring can produce its expected retaining strength even when there arises some error in the dimensions of the metallic ring during its fabrication (particularly when the diameter is greater than the design diameter) because the extended portion of the auxiliary body presses the metallic ring down the tapered portion of surface of the hole in the main body and shrinks the metallic ring to the prescribed diameter as described above.

The upper portion of the interior of the auxiliary body 20 may be such as to admit of the upper hemisphere of the ball 2 or come into contact in an annular zone with the surface above the equator of the ball. Otherwise, a plurality of triangular walls 28 may be integrally formed on the upper interior as in the third embodiment, so that these triangular walls may come into contact with the ball from above.

To prevent the tightened auxiliary body 20 from spontaneously coming loose, the auxiliary body may be provided with a flexible projected piece 20' containing a downward protuberance 29a such that the protuberance 29a may plunge into a hole 29b formed in the main body 6 of the socket after the auxiliary body has been completely driven into position. The protuberance 29a and the hole 29b cooperate to serve as a device 29 for preventing the auxiliary body from producing rotary motion relative to the socket. Desired separation of the auxiliary body from the main body can be obtained by turning the projected piece 20' upwardly and pulling the protuberance 29a from the hole 29b. Desirably, on the upper side of the auxiliary body 20 there may be provided engaging holes 30 for admitting of the tips of a tool to be used for driving the auxiliary body into the hole or loosening it. These engaging holes 30 may be substituted by a recess of the shape of + or − for receiving the insertion of the tip of a screw driver, for example.

The male screw thread 24' on the periphery of the auxiliary body and the female screw thread 21' on the inner wall surface of the hole are desired to be multiple thread screws such that one or two complete turns of the auxiliary body may suffice for complete tightening.

In the embodiment so far described, the auxiliary body is adapted so as to be attached to and detached from the main body by a threading motion. Optionally, the attachment of the auxiliary body to the main body may be accomplished by forming a protuberance on either of the periphery of the auxiliary body and the inner wall surface of the cylindrical portion of the hole and an L-shaped groove on the remaining surface, inserting the auxiliary body into the hole while allowing the protuberance to move along the longitudinal side of the L-shaped groove, and causing the engaging device 29 to complete its own union when the travel of the protuberance in the lateral side of the L-shaped groove has terminated. When desired, the auxiliary body may be fused inseparably with the hole by high frequency welding.

For preventing accidental separation of the auxiliary body from the main body of the socket, a small protuberance 22a small enough to avoid interfering with the penetration of the ball 2 through the cylindrical hole 23 may be formed on the inner surface of the tapered surface 22 of the hole 19 and a notch 26a may be formed on the periphery at the lower end of the extended portion 26 of the auxiliary body 20 (FIG. 11). The retention of the ball by the ring 27 is accomplished by inserting the ring 27 into the hole in such a position that the gap 27' in the ring 27 may be aligned with the small protuberance 22a, inserting the ball 2 into the receptacle 19, and helically driving the auxiliary body 20 into the hole. The ball joint thus assembled can be disassembled by rotating the auxiliary body 20 in the direction of loosening thereby giving rise to a space between the tapered surface 22 of the hole 19 and the lower end of the extended portion 26 of the auxiliary body 20 and widening the gap 27' in the ring 27 enough to release the ball from the hole. The opposed ends 27a, 27b of the ring 27 across the gap are held askew, with the end 27a pressed against the tapered surface 22 of the hole and the other end 27b pressed against the lower end of the extended portion of the auxiliary body 20. An attempt to give a further rotation to the auxiliary body 20 only causes the opposed ends 27a, 27b of the ring to come into engagement with the small protuberances 22a on the tapered surface and the notch 26a on the lower surface of the extended portion 26 of the auxiliary body 20, with the result that the auxiliary body is prevented from being rotated any further. The separation of the ball stud from the receptacle, therefore, can be attained simply by rotating the auxiliary body in its loosening direction. The otherwise possible misplacement of the ring and other attendant part due to the separation of the auxiliary body, accordingly, can be precluded. Besides, the work for lodging the ball in safe retention within the receptacle can be facilitated.

As is clear from the foregoing description, this invention forms the socket of the ball joint with a plastic material for the purpose of decreasing the overall weight of the ball joint and preventing the ball joint from collecting rust. In the test of manufactured ball joints of this invention for ball's pull-out force, the values of pull-out force obtained in various test runs were invariably in the range of 200 to 250 kg. None of the ball joints betrayed embrittleness due to the material. They were as effectively usable as ball joints using metallic sockets.

What is claimed is:

1. A ball joint comprising:
   a ball stud having a ball at the leading end thereof;
   a plastic main body having a through hole which comprises a small-diameter protion on one side thereof, a large-diameter portion on the other side thereof and a tapered portion between said small-diameter portion and said large-diameter portion, said large diameter portion having a retaining portion;
   a cup-shaped auxiliary body being snugly fitted in said large-diameter portion of said through hole in said main body and having the leading end thereof extending to said tapered portion of said through hole, said leading end having engaging means which engage said retaining portion to retain said auxiliary body in said through hole;
   a resilient metallic ring for retaining said ball within said through hole, said resilient metallic ring having a cut therein,
   whereby said ball stud having said ball inserted into said through hole from said small-diameter portion and passed through said resilient metallic ring while enlarging the diameter of said resilient metallic ring, after inserting said resilient metallic ring into said through hole from said large-diameter portion and then fitting said cup-shaped auxiliary body snugly in said large-diameter portion, is prevented from being released from said through hole by said resilient metallic ring which is pushed enlarged in diameter by insertion of said ball and which, upon passage of said ball therethrough, is returned to its original state.

2. A ball joint according to claim 1, wherein said means fulfills its function by snap engagement.

* * * * *